United States Patent Office 3,465,573
Patented Sept. 9, 1969

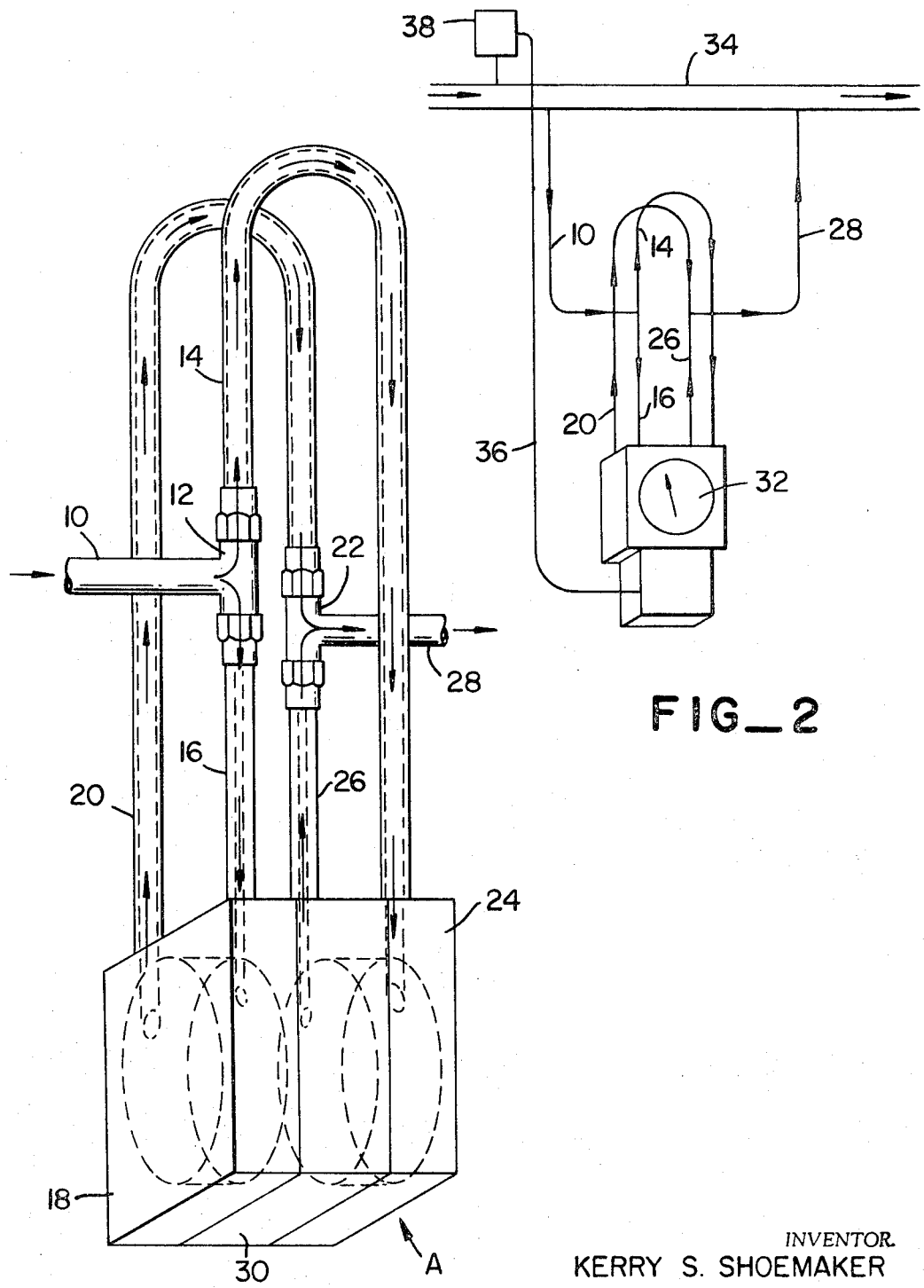

3,465,573
APPARATUS FOR CONTINUOUS MEASUREMENT OF LIQUIFORM PRODUCT CONSISTENCY
Kerry S. Shoemaker, Fremont, Mich., assignor to Gerber Products Company, Fremont, Mich., a corporation of Michigan
Filed June 5, 1967, Ser. No. 643,432
Int. Cl. G01n *11/02;* G05d *11/00*
U.S. Cl. 73—54                                         4 Claims

ABSTRACT OF THE DISCLOSURE

A direct reading continuous consistometer in which the fluid to be measured passes from the intake conduit directly into and through the pressure chambers of a differential pressure measuring device and from the pressure chambers to the discharge conduit. Output signals from the device are employed to adjust and control the consistency of the fluid.

---

This invention relates to continuous consistometers and, more particularly, to an improved consistometer for the direct measurement of product consistency.

The concept of continuous in-line blending of industrial products such as pureed and formulated foods was initiated with the development of a continuous consistometer, the principles of which were disclosed and claimed in U.S. Patent No. 2,948,145. Apparatus manufactured in accordance with the teachings of the above-noted patent, while working well in accordance with those principles, met a number of practical difficulties.

The original apparatus designed to measure liquiform product consistency continuously comprised a small pump delivering a known volume of liquiform product to a pair of branched tubes of differing inside diameters and smaller sensing lines leading from each of the branches to a pressure differential gauge or transmitter. The apparatus was therefore very much like that shown in FIG. 2 of Patent No. 2,948,145. However, in order to obtain consistent readings of the viscous product, it was necessary to introduce a small flow of water into the pressure differential gauge to preclude the plugging of the sensing lines.

The addition of the water to the system led to certain problems. First, the rate of flow of the water affects the pressure as sensed by the differential pressure gauge, therefore making the system unstable. Second, the small diameter water lines tended to become filled with the viscous product transmitted to the differential pressure gauge body. There would be occasional clogging of these lines and, in addition, the arrangement was considerably less sanitary than is desirable in the handling of a food product because of the introduction of the outside source of water and because product unavoidably enters the sensing lines.

An additional problem was that if a differential pressure transmitter were used, the output signal required considerable damping so that the sensitivity and speed of response, as well as the accuracy, of the unit were considerably reduced.

The present invention is an improvement upon the apparatus described above in that the water system has been completely eliminated. In the present construction, the same diameter branch tubes may be used or other tubes which have the proper ratio of length to inside diameter may be used, but instead of tapping of these tubes for detecting the pressure differential, the branch tubes are led directly into the pressure chambers of a pressure differential gauge or pressure differential transmitter. This results in a direct reading of the pressure differential and therefore of the product consistency.

In the preferred embodiment of this improvement the liquiform product is pumped directly into a T-shaped connection. The branches of the T are fitted with different diameter tubes, each leading to the opposite side of a pressure differential transmitter. Not only do the diameters of the two inlet branches differ, but their lengths as well. Each of the inlet tubes has a corresponding outlet tube, the small diameter inlet tube having a large diameter outlet tube from its side of the differential pressure transmitter body, and the large diameter inlet tube having a corresponding small diameter outlet tube on its side of the differential pressure transmitter body. The shorter length inlet tube is coupled with a longer length outlet tube and the longer length inlet tube is coupled with a shorter length outlet tube so that the total pressure drop from inlet to outlet is the same through either branch.

The improved design eliminates the requirement for supplementary water to be fed to the differential pressure gauge or transmitter and, at the same time, has the advantage that the pressure differential readings are more stable, are repeated with far more accuracy, and the unit is far more sensitive to changes in consistency. The new design has the further advantage of being able to be cleaned in place by standard cleaning-in-place procedures.

In the drawings:

FIG. 1 is a perspective view of the consistometer construction showing the connections to the differential pressure transmitter body and the flow path; and FIG. 2 is a diagram showing the connection of the consistometer into a line carrying liquiform product.

Referring now more particularly to the drawing in which similar characters of reference represent corresponding parts in each of the several views, the differential pressure detector A is shown generally in FIG. 1. The liquiform product is led to the pressure chambers through the intake conduit 10. This leads into a T-connection 12 having two branches, a large diameter first branch 14 and a small diameter second branch 16. The small diameter branch 16 leads directly into the high pressure chamber 18 of the differential pressure detector. The outlet 20 from the high pressure chamber of the differential pressure detector leads to another T fitting 22. Branch 14 which also leads from the inlet T fitting 12 has a larger diameter than branch 16. Branch 14 leads directly into the low pressure chamber 24 of the differential pressure detector. The outlet 26 from the low pressure chamber leads directly into the T fitting 22 which in turn is connected to the discharge conduit 28.

Branches 16 and 26 are not only of the same diameter, but, as may be noted in the drawing, they are also the same length. Branches 14 and 20 are, similarly, of equal length and diameter so that there will be equal flow through the two sets of branches.

Between the high pressure chamber 18 and the low pressure chamber 24 is the diaphragm element 30. The diaphragm element senses the pressure differential between the high pressure chamber 18 and the low pressure chamber 24 and may be directly connected to a dial gauge 32 as seen in FIG. 2 and in addition may transmit a signal either electrically or pneumatically to a recorder or controller.

In FIG. 2 the consistometer is shown connected into a supply line 34 carrying the liquiform product whose consistency is to be measured. The high and low pressure chambers are not shown individually in this figure; the direct reading dial 32 is shown on the face of the apparatus. A pneumatic signal is carried through line 36 to a control unit 38 which regulates the supply of water into the product line 34 to vary the product consistency. Increases or decreases in the product consistency in the supply line 34 are sensed by the consistometer and a signal sent through line 36 to the controller 38 to supply additional water to the product passing through the supply conduit 34 or to restrict the amount of water when the consistency is less than optimum.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit and scope of my invention.

I claim:

1. In a continuous consistometer for measuring the consistency of a liquiform product of the type comprising: a pressure-responsive diaphragm with a high pressure side and a low pressure side; branched paths for carrying equal flow of the liquiform product; and a connection between each side of the diaphragm and a product flow path for detecting relative pressure drop through the paths; the improvement comprising: a first conduit for carrying the flow in one path into direct contact with the high pressure side of the diaphragm; and a second conduit for carrying the flow in the other branched path into direct contact with the low pressure side of the diaphragm.

2. A continuous consistometer for measuring the consistency of a liquiform product under pressure comprising: a pressure differential detector having a low pressure chamber and a high pressure chamber, each chamber having an inlet and an outlet; an intake conduit for conveying the liquiform product form a supply conduit; a first branch and a second branch leading from said intake conduit; said first branch having a larger inside diameter than said second branch; said first branch connected to the inlet of the low pressure chamber; said second branch connected to the inlet of the high pressure chamber; and a discharge conduit for collecting the discharge from the outlets of said chambers and returning it to the supply conduit.

3. The continuous consistometer of claim 2 and including a third branch and a fourth branch, said third branch having the same inside diameter and length as said second branch; said fourth branch having the same inside diameter and length as said first branch; said third branch connected to the outlet of the low pressure chamber, said fourth branch connected to the outlet of the high pressure chamber, and said third and fourth branches connected into the discharge conduit.

4. The method of continuously determining the consistency of a liquiform product comprising the steps of: obtaining a flowing sample of the liquiform product; dividing the flow of the sample equally into two confined paths of different cross sections; passing the flow in each confined path through a pressure chamber, the chamber being separated by a pressure responsive member into two separate chambers; measuring the pressure differential between the chambers resulting from the flow passing through the confined paths and the chambers as indicated by the pressure responsive member; and returning the sample to its source.

References Cited
UNITED STATES PATENTS 2,597,138   5/1952   Trigg _____ 73—55 X
2,948,145   8/1960   Eolkin _____ 73—54

LOUIS R. PRINCE, Primary Examiner

J. W. ROSKOS, Assistant Examiner

U.S. Cl. X.R.
137—92